(12) United States Patent
Campbell et al.

(10) Patent No.: US 7,401,877 B2
(45) Date of Patent: Jul. 22, 2008

(54) PRINTING MODE FOR A PRINTER

(75) Inventors: James B. Campbell, Beaverton, OR (US); Trevor J. Snyder, Newberg, OR (US); Walter S. Harris, Portland, OR (US)

(73) Assignee: Xerox Corporation, Norwalk, CT (US)

( * ) Notice: Subject to any disclaimer, the term of this patent is extended or adjusted under 35 U.S.C. 154(b) by 95 days.

(21) Appl. No.: 11/534,295

(22) Filed: Sep. 22, 2006

(65) Prior Publication Data

US 2008/0074454 A1    Mar. 27, 2008

(51) Int. Cl.
*B41J 2/205* (2006.01)
(52) U.S. Cl. ........................................ 347/15
(58) Field of Classification Search .................. 347/15, 347/43, 12, 9; 358/1.2, 1.9, 3.23, 529
See application file for complete search history.

(56) References Cited

U.S. PATENT DOCUMENTS

| | | | |
|---|---|---|---|
| 4,682,216 A * | 7/1987 | Sasaki et al. ............. | 358/529 |
| 5,229,790 A | 7/1993 | Matsuura et al. | |
| 5,600,353 A | 2/1997 | Hickman et al. | |
| 5,790,166 A | 8/1998 | Nacman | |
| 5,992,971 A * | 11/1999 | Takahashi et al. ......... | 347/43 |
| 6,048,821 A | 4/2000 | Demmel et al. | |
| 6,084,604 A * | 7/2000 | Moriyama et al. ........ | 347/15 |
| 6,158,837 A | 12/2000 | Hilton et al. | |
| 6,189,993 B1 | 2/2001 | Mantell | |
| 6,257,698 B1 | 7/2001 | Bloomberg et al. | |
| 6,375,297 B1 | 4/2002 | Hayashi et al. | |
| 6,511,148 B1 | 1/2003 | Colombi et al. | |
| 6,862,110 B2 | 3/2005 | Harrington | |
| 6,972,857 B2 | 12/2005 | Mantell et al. | |
| 2002/0196453 A1 | 12/2002 | Parker et al. | |
| 2006/0067743 A1 | 3/2006 | Nishikawa | |

OTHER PUBLICATIONS

"Before You Buy a Laser or Inkjet Printer," Hardware, vol. 9, Issue 6, Jun. 2001, pp. 6-9 in print issue, 5 pages total.
Jaeger, C., "Color Solid Ink Printing," Society for Imaging Science and Technology, 6 pages total.

* cited by examiner

*Primary Examiner*—Lamson D. Nguyen
(74) *Attorney, Agent, or Firm*—Gibb & Rahman, LLC (57) ABSTRACT

The embodiments provide a printer and a printing method that incorporate a printing mode capable of achieving high monochromatic quality at a low cost per page. This printing mode prints both fully saturated (or only minimally desaturated) monochrome images (e.g., black text and graphics) with no undercolor and significantly desaturated multi-color images on the same print medium. Optionally, the printing mode uses a specified resolution that is less than the maximum resolution, but greater than the minimum resolution. The printing mode also optionally prints outlines around monochrome images and/or color images in order maintain and enhance image quality.

20 Claims, 4 Drawing Sheets

PRINTING MODE FOR A PRINTER

BACKGROUND

1. Field

Embodiments herein generally relate to printers and methods of printing and, more particularly, to a printing mode that achieves high monochromatic quality at a low cost per page.

2. Description of Related Art

There are many different printing technologies that are capable of generating hard copy output. Laser and Solid Ink are two different technologies that are commonly used in a networked office environment. Generally speaking, the current cost of printing a color document is higher compared to that of a black and white (monochrome) document. This is true for a number of reasons. First, Laser and Solid Ink print technologies both use primary colors of cyan, magenta, yellow and black in various mixtures to generate all other representable colors. To produce the color black requires the use of only one printed pixel per location. However, many colors take numerous pixels per location to be adequately represented. For example, the colors red, green, and blue can take up to two pixels per location. Therefore, a color print uses more ink or toner compared to a monochrome print. Also, color printers are more complex, have more parts, and the technology is not as mature. Finally, the ink and/or toners are also more expensive to manufacture.

Faster and/or cost-saving print modes such as, draft or fast color print modes, can be incorporated into ink jet printers. However, these print modes are generally associated with reduced quality and are not necessarily always cost-saving. For example, undercoloring techniques, such as that illustrated in U.S. Patent Application Publication No. 2002/0196454 of Parker et al., published on Dec. 26, 2002, the complete disclosure of which is incorporated herein by reference, have been employed to enhance black print quality in a draft mode. Such techniques use a significant amount of undercolor (i.e., dots of cyan (C), magenta (M), and yellow (Y)) under black (K) in the black and gray images to enhance the print quality. Since the cost of color ink is higher than the cost of black ink, this undercoloring technique increases the cost of monochrome printing.

Therefore, the embodiments discussed below provide a printer and an associated printing method that incorporates a printing mode which can be used to reduce the cost of color printing without significantly reducing the quality of monochrome printing within the same printed page. More specifically, the embodiments below use a value added printing mode that is aligned with the needs of a "monochrome printer with color" user that values monochrome print quality, but can be adverse to high color costs.

SUMMARY

In view of the foregoing disclosed herein are embodiments of a printer and of a printing method that incorporate a printing mode that is capable of achieving high monochromatic quality at a low cost per page. Specifically, one printing mode prints fully saturated (or only minimally desaturated) monochrome (e.g., black) images and significantly desaturated color images. Optionally, to maintain and enhance the quality of monochrome and/or color images, the images may be outlined with solid borders. Printing in this manner results in high quality monochromatic images (e.g., high quality black text or graphics) and color images with a quality similar to the current state of the art fast color mode. This color quality is good enough for many customer applications and is particularly good compared to the same print with just monochrome alone.

More particularly, disclosed herein are printer embodiments. The printer comprises an interface through which the printer receives print data and a selected print mode from an output device. The print data can include pixel locations on a print medium for black and color dots that represent monochrome (e.g., black) images and multi-color images (i.e., color images). These images can include text and/or graphics. The printer further comprises a printing mechanism that is adapted to print the black and color dots onto the print medium at the specified pixel locations in order to form the monochrome and color images. The printing mechanism can, for example, use solid or non-solid ink jet technology or laser technology. The printer also comprises a memory device that stores various sets of print mode instructions that correspond to specific print modes (e.g., a deluxe quality print mode, a high quality print mode, regular quality print mode, a draft or fast color quality print mode, or a high saturation monochrome/low saturation color print mode). Each set of instructions, when executed by a controller (discussed below), causes the printing mechanism to print the monochrome and color images represented by the print data according to the corresponding selected print mode.

Specifically, one set of instructions that is stored in the memory device can comprise instructions for printing in a high saturation monochrome/low saturation color print mode. This set of instructions can include instructions for printing the black dots such that the monochrome images (e.g., the black images) are formed without undercolor at a specified first saturation level. The first saturation level can be equal to a maximum saturation level or, alternatively, slightly less than the maximum saturation level. This set of instructions can also include instructions for printing the dots (e.g., the color dots and, if necessary, the black dots) such that color images are formed at or below a specified second saturation level that is less than the maximum saturation level and, specifically, that is less than the first saturation level of the monochrome images. Additionally, this set of instructions can include instructions for printing all of the dots at a specified resolution (e.g., a maximum resolution, a minimum resolution, etc.). Optimally, cost and quality are balanced and the specified print resolution will be less than the maximum resolution, but greater than the minimum resolution (e.g., at the default print mode). Furthermore, in order to maintain quality printing of text and lines (e.g., when the resolution is less than the maximum resolution), this set of instructions can also include instructions for printing monochrome outlines around the monochrome images as well as instructions for printing color outlines around the color images.

The printer can further comprise a controller that is operatively connect to the interface, the memory device and the printing mechanism and is adapted to receive both the print data and the selected print mode via the interface, to access the set of instructions in the memory device that correspond to the selected print mode, and to execute the set of instructions in order to control the printing mechanism and, thereby, to print the images represented by the print data, according to the selected print mode.

Also, disclosed herein are printing method embodiments that comprise storing sets of print mode instructions in a memory device of a printer. Each set of print mode instructions can correspond to a specific print mode (e.g., a deluxe quality print mode, a high quality print mode, regular quality print mode, a draft or fast color quality print mode, or a high saturation monochrome/low saturation color print mode).

When executed by a controller, a set of print mode instructions can cause the printing mechanism to print images represented by print data onto a print medium according to the corresponding print mode.

The method can further comprise receiving print data and a selected print mode. For example, a printer can receive the print data and a selected print mode via an interface with an output device. The print data can comprise pixel locations on a print medium for black and color dots that represent both monochrome images (e.g., black images) and multi-color images (i.e., color images). The images can include text and/or graphics.

The method can further comprise printing the dots at the specified pixel locations according to the selected print mode in order to form the monochrome and color images. That is, within the printer a controller can access and execute a set of instructions for the selected print mode that are stored in a memory device. Then, based on the set of instructions and on the print data, the controller can generate electrical signals in order to control the printing of black and color dots onto a print medium by a printing mechanism (e.g., by a printing mechanism that employs solid or non-solid ink jet technology or laser technology).

Specifically, if the high saturation monochrome/low saturation color print mode is selected, the dots can be printed so that the monochrome images (e.g., black images) are formed without undercolor at a full saturation level or at a minimally reduced saturation level (i.e., a first saturation level) and so that the color images are formed at or below a second saturation level that is less than the maximum saturation level and, specifically, that is less than the first saturation level of monochrome images. Additionally, all of the dots can be printed at a specified resolution (e.g., a maximum resolution, a minimum resolution, etc.). Optimally, cost and quality are balanced and this specified resolution will be less than the maximum resolution, but greater than the minimum resolution. Furthermore, to maintain and enhance the quality of the images, the monochrome and/or color images can be outlined with solid borders (e.g., monochrome outlines around monochrome images and color outlines around color images).

These and other features are described in, or are apparent from, the following detailed description.

BRIEF DESCRIPTION OF THE DRAWINGS

Various exemplary embodiments of the systems and methods described in detail below, with reference to the attached drawing figures, in which.

DETAILED DESCRIPTION

Figure 1:
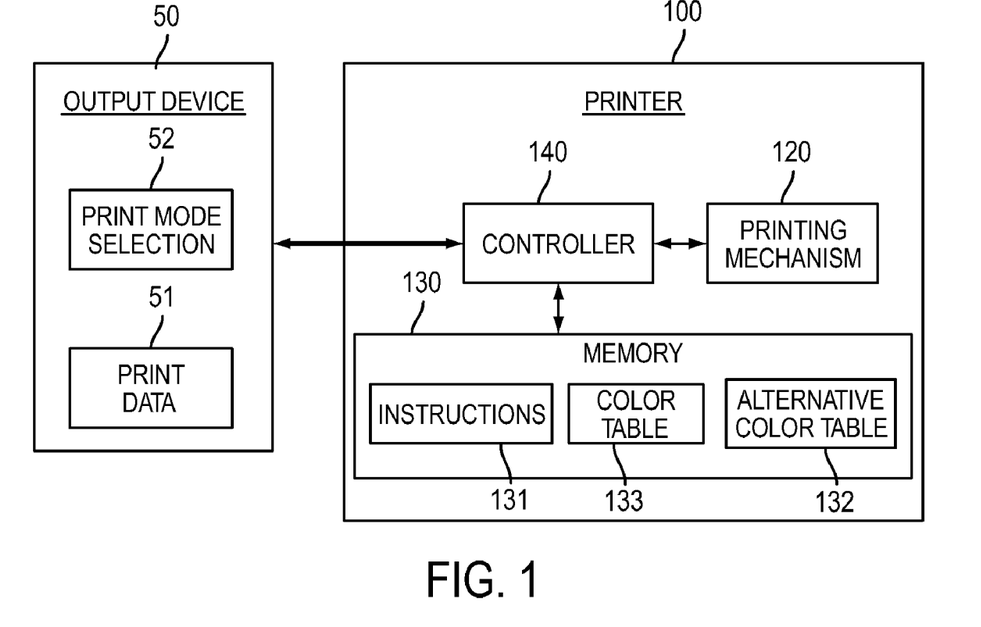
FIG. 1 is a schematic block diagram of an embodiment of a printer, incorporating a set of instructions for a less than maximum resolution, high saturation black/low saturation color print mode print mode.

FIG. 1 shows a schematic block diagram representing a printer 100, according to various embodiments, that incorporates a printing mode that is capable of achieving high monochromatic quality at a low cost per page. Specifically, one printing mode prints fully saturated (or only minimally desaturated) monochrome images with no undercolor and significantly desaturated color images. Optionally, this printing mode may use a less than maximum resolution. Also, optionally, this printing mode may outline the monochrome images and/or the color images with solid borders in order to maintain and enhance image quality. Printing in this manner results in high quality monochromatic images and color images with a quality similar to current state of the art fast color print mode.

More particularly, referring to FIG. 1, disclosed herein are embodiments of a printer 100 that comprises an interface 110, such as a graphic user interface or input/output connection, with an output device 50 (e.g., a host computer or scanner), a printing mechanism 120, at least one memory device 130, and a controller 140 that is operatively coupled to each of the other components (i.e., to components 110, 120, and 130).

Via the interface 110 the printer 100 can receive from the output device 50 print data 51 that digitally represents monochrome images (e.g., black images) and multi-color images (i.e., color images). Such images can include, for example, text, graphics, characters, etc. Specifically, the printer 100 can receive pixel locations on a print medium for black and color dots that when printed form both monochrome images and color images on the same print medium. The printer 100 can also receive a selected print mode 52 from the output device 50 via the interface 110. The selected print mode 52 can be selected through the output device 50 by a user or by default from one of several available print modes.

Figure 2:
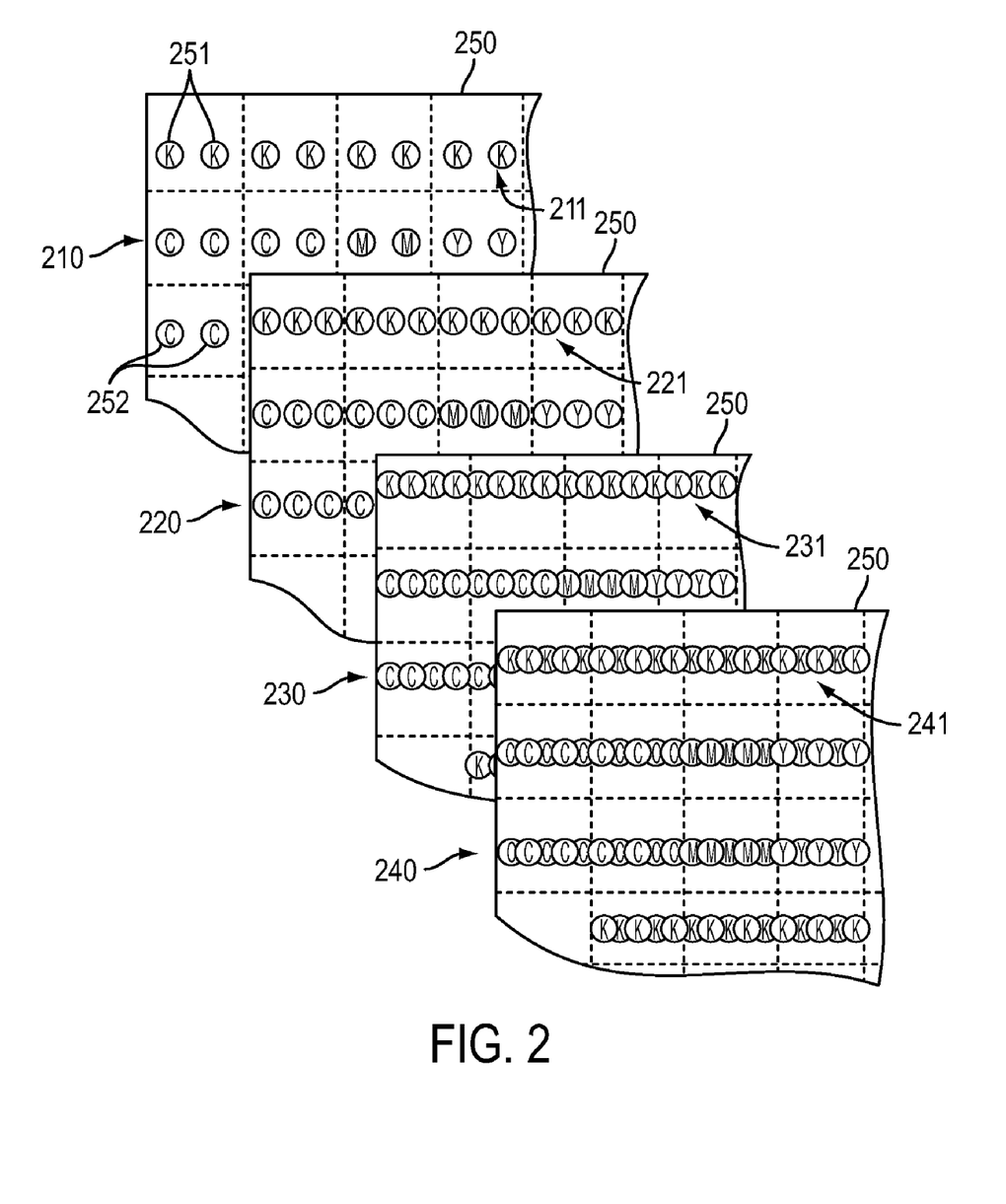
FIG. 2 is a schematic representation of varying print resolutions on multiple print mediums illustrating draft, regular, high and deluxe quality print modes.

FIG. 2 is a schematic representation of various exemplary print modes, including a draft print mode, a regular print mode, a high quality print mode and a deluxe quality print mode, each on a different print medium 210, 220, 230 and 240, respectively. The various print modes can have increasing resolutions 211, 221, 231, 241 (i.e., dots per inch (dpi)) and thus, a corresponding increase in cost. This increase in cost is due to the increase in average ink dot coverage (i.e., the increase in the number of black (K) dots 251 or color (e.g., cyan (C), magenta (M) or yellow (Y)) dots 252 per pixel location 50 or per inch (dpi)). For example, the print medium 240 with the deluxe quality print mode may comprise a maximum achievable resolution 241. Each of the other print mediums 230, 220, 210 that are represented have successive lesser quality print modes that comprise reduced resolutions 231, 221, 211, respectively, as compared to the maximum resolution. For ease of illustration, FIG. 2 represents changes in resolution in only one dimension; however, those skilled in the art will recognize that such resolution changes typically occur in two dimensions. Furthermore, those skilled in the art will also recognize that varying the print mode quality may also be accomplished by varying one or more other features, such as, bidirectional or monodirectional scanning, ink or toner consumption, population rate and/or printing speed and that by varying these other features the costs between the different print modes will similarly be varied. Additional details regarding the exemplary print modes and methods of selecting print modes via an output device are provided in U.S. Pat. No. 6,189,993 of Mantel issued Feb. 20, 2001 and in U.S. Pat. No. 6,511,148 of Colombi et al. issued on Jan. 23, 2003, the complete disclosures of which are incorporated herein by reference.

Referring again to FIG. 1, the printing mechanism 120 of the embodiments can be any printing mechanism configured to print black (K) dots and color dots (e.g., cyan (C), magenta (M) and yellow (Y)) onto a print medium (e.g., paper) at varying resolutions and saturation levels. For example, the printing mechanism 120 can incorporate solid or non-solid ink jet technology, as illustrated in the following documents (the complete disclosures of which are incorporated herein by reference): U.S. Pat. No. 6,189,993 of Mantel issued Feb. 20, 2001; and U.S. Pat. No. 6,158,837 of Hilton et al. issued Dec. 12, 2000. Alternatively, the printing mechanism 120 can incorporate laser technology, as illustrated in the following documents (the complete disclosures of which are incorporated herein by reference): U.S. Pat. No. 5,229,790 of Matsuura et al. issued Jul. 20, 1993; U.S. U.S. Patent Application Publication No. US2006/0067743 of Nishikawa published on Mar. 30, 2006.

The memory device(s) 130 (e.g., a read only memory (ROM), a random access memory (RAM), etc.) can store printer operating system software and programming data, including sets of print mode instructions 131. Specifically, each set of print mode instructions 131 corresponds to a specific print mode and, when executed, causes the printing mechanism to print the black and color dots at the pixel locations specified in the print data and further to print the dots according to the corresponding print mode. Thus, referring to FIG. 2, the memory device 130 can store the following sets of print mode instructions 131: a set of instructions for printing the black (K) and color (CMY) dots 251-252 at pixel locations 250 in a deluxe quality mode 241; a set of instructions for printing the black and color dots 251-252 at pixel locations 250 in a high quality mode 231; a set of instructions for printing the black and color dots 251-252 at pixel locations 250 in a normal quality mode 221; and a set of instructions for printing the black and color dots 251-252 at pixel locations 250 in a draft quality or fast color mode 211. The memory device 130 can also store additional sets of instructions for any other print modes.

Specifically, one of the sets of instructions 131 that is stored in the memory device 130 can comprise a set of instructions for printing in a high saturation monochrome/low saturation color print mode. That is, one of the sets of instructions 131 can comprise instructions for printing the black dots (K) and the color dots (CMY) such that the monochrome images (e.g., black images) are formed at a full or minimally reduced saturation level (i.e., a first saturation level) and such that the multi-color images (i.e., color images) are formed at or below a second saturation level that is less than the maximum saturation level and, specifically, that is less than the first saturation level of the black images.

More specifically, this set of instructions 131 can comprise instructions for printing the black images (i.e., black text and graphics) at a first saturation level that is equal to the maximum achievable saturation level (i.e., 100% saturation) using black dots (K) alone (i.e., no undercolor). Alternatively, this set of instructions can comprise instructions for printing the black images at a first saturation that is somewhat less than the maximum saturation level (e.g., a specified level within 1-99% saturation, within 60-98% saturation, within 70-95% saturation, etc), thereby, reducing the average black coverage by a corresponding percentage. In addition to instructions regarding the first saturation level of the monochrome images, this set of instructions can also comprise instructions for printing the color images at or below a significantly reduced second saturation level that is below the first saturation level, using color (CMY) dots and, if necessary, black dots (K). For example, the instructions can indicate that the color images are to be formed with no greater than a second saturation level (e.g., a specified level that is no greater than 70% saturation, no greater than 60% saturation, no greater than 50% saturation, etc.) such that the average color coverage is significantly reduced by a corresponding percentage. This second saturation level can, for example, correspond to the saturation level used in current state of the art fast color print modes.

In order to accomplish printing and, specifically, to accomplish printing at the reduced saturation levels, the memory device 130 can further comprise a color table 133 and an alternative color table 132 that are accessible by the controller 140. These color tables 132-133 can, for example, be based on well-known HSV (Hue and Saturation) or HLS (Hue, Lightness and Saturation) color systems that are common used in the art. These tables 132 and 133 can be used (e.g., by the controller 140, discussed below) to map the requested (or ideal) color values contained in the print data 51 to the new reduced saturation color values indicated by the printing mode 52. As discussed in U.S. Pat. No. 6,972,857 of Mantell et al., issued on Dec. 6, 2005, the complete disclosure of which is incorporated herein by reference, such color table techniques are well-known features of color management systems. Thus, for example, the color table 133 and alternative color table 132 can be used to map a fully saturated color as indicated by the print data to a 50% saturated color and to, thereby, reduce color coverage (e.g., from an average of 6.0 grams/inch$^2$ to 2.5-3.0 grams/inch$^2$).

In addition to specifying the saturation levels for the monochrome and color images, this set of instructions can include instructions for printing all of the dots at a specified resolution, e.g., a maximum resolution, a minimum resolution, or any other specified resolution. Optimally to ensure high quality but at a reduced cost, the specified resolution will be less than the maximum resolution (e.g., less than the resolution 241 used in the deluxe print mode 240 of FIG. 2) and greater than the minimum resolution (e.g., greater than the resolution 211 used in the draft print mode 210 of FIG. 2). For example, the resolution can be the same as the printer default resolution.

Figure 3:
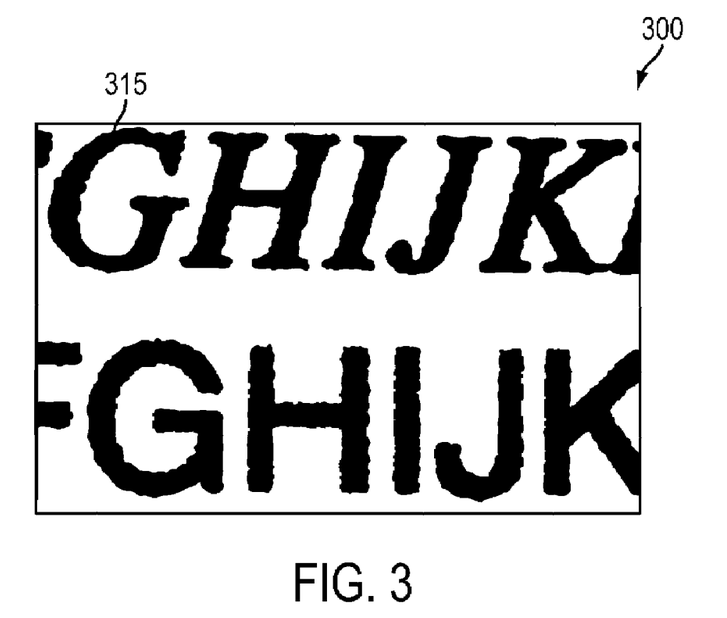
FIG. 3 is a schematic representation of printed text without a border of additional dots.
Figure 4:
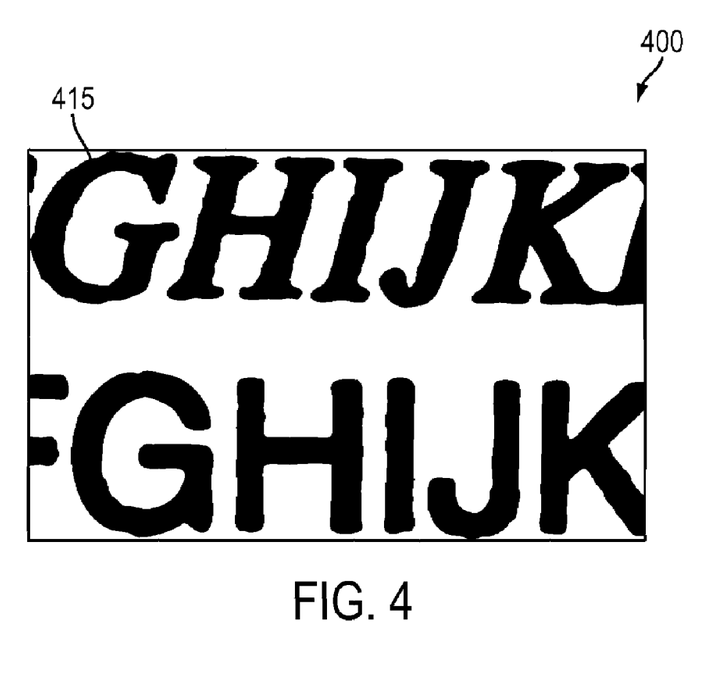
FIG. 4 is a schematic representation of printed text with a border of additional dots.

Those skilled in the art will recognize that lowering the resolution to below a maximum achievable resolution can cause printed images and, particularly, lines and text to appear grainy. That is, as illustrated in FIG. 3, the edges 315 of images 300 (i.e., text and/or graphics) may appear rough. Therefore, in order to maintain the text and line quality of the printed images, the set of instructions for the high saturation monochrome/low saturation color print mode can further comprise instructions for outlining the monochrome images (i.e., for printing additional black dots to outline the black images with a solid border) and/or instructions for outlining the color images (i.e., for printing additional color dots and, if necessary, black dots to outline color images with a solid border). Thus, as illustrated in FIG. 4, the edges 415 of outlined images 400 will appear more defined and sharp.

Furthermore, while other print modes (e.g., the regular 220 or draft 210 print modes of FIG. 2) may include instructions for printing undercolor to enhance the black images, as illustrated in U.S. Patent Application Publication No. 2002/0196454 referenced above, this high saturation monochrome/low saturation color print mode can be implemented so that no level of color is used in any level of black (i.e., so that no undercolor is used) and, thus, so that the black images comprise true black and not composite black.

It is anticipated that this high saturation monochrome/low saturation color print mode will most often be implemented for printing documents having a majority of text and graphics (e.g., tables, charts, etc.) in black, but also having some multi-colored images. Therefore, the exemplary monochrome images discussed herein are interchangeably referred to as black images or black text and graphics. However, this language is not intended to be limiting. Specifically, the print mode may be implemented for printing documents having the majority of text and graphics in another single color (e.g., cyan, yellow or magenta). Thus, the monochrome images referred to herein may be printed in a color other than black without departing from the generic concept, and, therefore, such adaptations and modifications should and are intended to be comprehended within the meaning and range of equivalents of the disclosed embodiments.

Referring again to FIG. 1, the controller 140 that is operatively coupled to the interface 110, the memory device(s) 130 and the printing mechanism 120, is adapted to access the instructions 131 from the memory 130 and execute them by generating electrical signals in response to the print data in order to control the printing mechanism 120. Specifically, the controller 140 can comprise a microprocessor that receives both the print data 51 and the selected print mode 52 via the interface 110. The microprocessor 140 is programmed to access the set of instructions 131 in the memory device 130 that correspond to the selected print mode 52 and to execute the appropriate set of instructions 131 in order cause the images represented by the print data 51 to be printed on the print medium by the printing mechanism 120, according to the selected print mode 52.

For example, if the high saturation monochrome/low saturation color print mode is the selected print mode, the microprocessor 140 will access the color table 133 and the alternative color table 132 in order map the requested (ideal) colors values contained in the print data 51 to the new reduced saturation color values indicated by the selected print mode 52. Then, the microprocessor 140 will generate electrical signals, based on the altered print data 51 with the new saturation color values and on the corresponding set of instructions 131, in order to control the printing mechanism 120. Specifically, the generated electrical signals will cause the printing mechanism 120 to print the dots at the specified resolution and with the new saturation values so that the monochrome images are formed at a first saturation level that is approximately equal to the maximum saturation level (or a specified saturation level below the maximum) and so that the color images are formed at or below a second saturation level that is less than the first saturation level.

Figure 5:
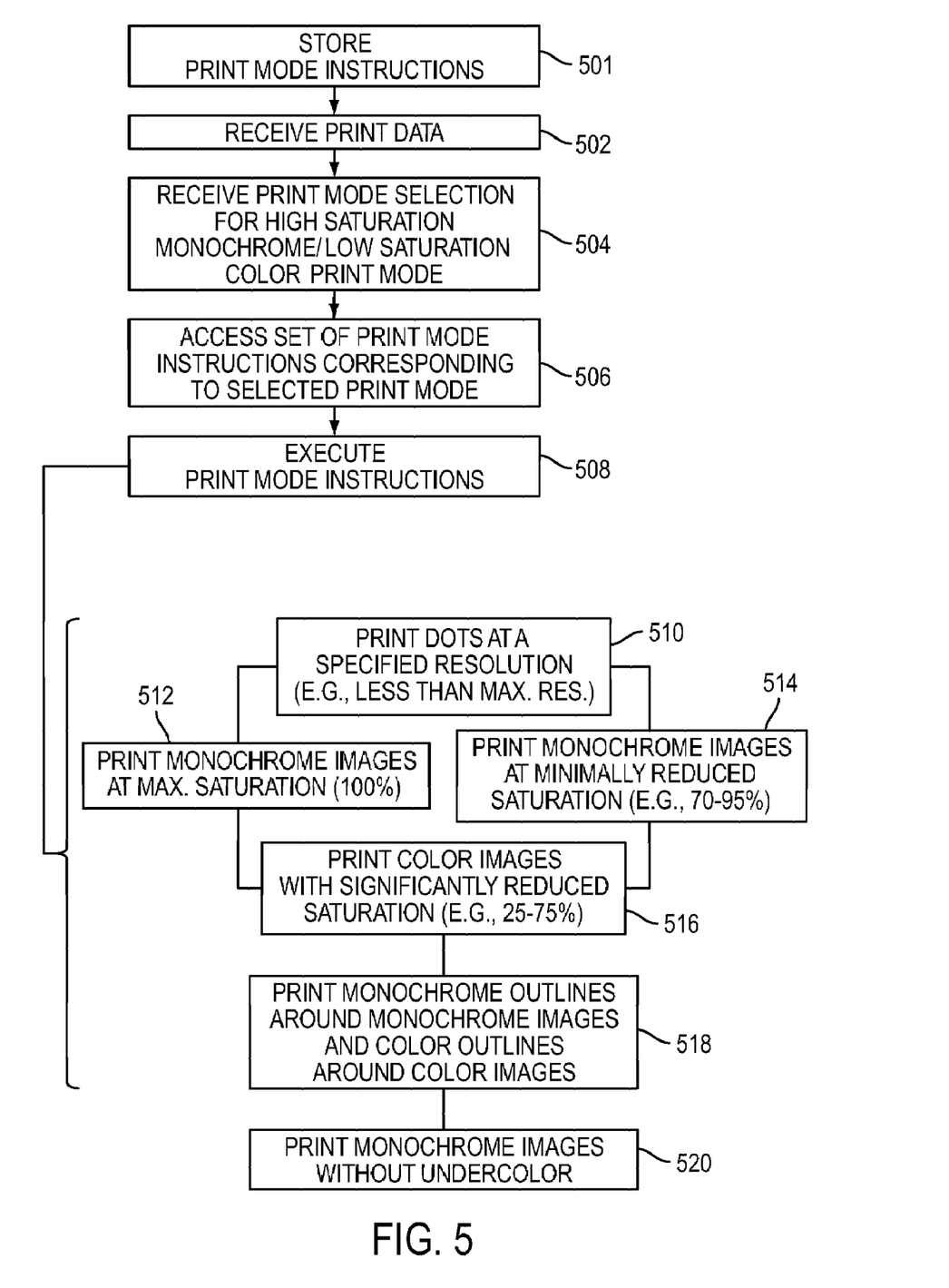
FIG. 5 is a flow diagram illustrating an embodiment of a method of printing.

Referring to FIG. 5 in combination with FIG. 1, also disclosed herein are printing method embodiments that comprise storing sets of print mode instructions (501) in a memory device 130 (e.g., a read-only-memory (ROM) of a printer 100. Each set of print mode instructions can correspond to a specific print mode (e.g., a deluxe quality print mode, a high quality print mode, regular quality print mode, a draft or fast color quality print mode, a high saturation monochrome/low saturation color print mode, or any other print mode). When executed by a controller, each set of instructions can cause the printing mechanism to print images represented by print data onto a print medium according to that specific print mode. The method can further comprise receiving by a printer 100 of print data 51 (502) and also receiving a selected print mode 52 (504).

For example, a printer 100 can receive the print data 51 and a selected print mode 52 via an interface 110 with an output device 50, (e.g., via a graphical user interface of a host computer or scanner). The print data 51 can comprise pixel locations on a print medium for black and color dots that digitally represent monochrome images (e.g., black images) and multi-color images (i.e., color images). The images can include, for example, text, graphics, characters, etc. The selected print mode can be selected by a user or by default from one several available print modes (e.g., a deluxe quality print mode, a high quality print mode, a normal quality print mode, a draft quality print mode, a high saturation monochrome/low saturation color print mode, or any other print mode).

The method can further comprise accessing and executing the set of instructions 131 corresponding to the selected print mode 52 (506-508). That is, within the printer 100, a controller 140 (i.e., a microprocessor) can access the specific set of print mode instructions 131 that are stored in the memory device 130. Then, based on the specific set of instructions 131 and on the print data 51, the controller 140 can generate electrical signals, as described in U.S. Pat. No. 6,189,993 referenced above, in order to control printing onto a print medium by a printing mechanism 120 that uses, for example, laser technology or solid or liquid ink jet technology.

Specifically, if the high saturation monochrome/low saturation color print mode is selected at process 504, the black and color dots are printed such that monochrome images (e.g., black images) are formed at a full saturation level or a minimally reduced saturation level (i.e., a first saturation level) without undercolor and such that multi-color images (i.e., color images) are formed at a second saturation level that is less than that of the monochrome images (i.e., less than the first saturation level) (512-516). More specifically, dots (e.g., black dots) are printed such that monochrome images (e.g., black images) are formed without undercolor and at a first saturation level that is equal to the maximum achievable saturation level (i.e., 100% saturation) (512). Alternatively, dots (e.g., black dots) are printed such that the monochrome images are formed at a first saturation level that is somewhat less than the maximum saturation level (e.g., at a specified level within 1-99% saturation, within 60-98% saturation, within 70-95% saturation, etc) and, thus, such that the average monochrome (e.g., black) coverage is reduced by a corresponding percentage (514). While desaturated monochrome images are an option at process 514, those skilled in the will recognize that lowering the overall resolution may be a better solution than reducing monochrome saturation, if both color and monochromatic quality are to be traded-off. In addition, color dots and, if necessary, black dots are printed such that the color images are formed with no greater than a second saturation level (516). That is, the dots, including both color and black dots, that form the multi-color images can be printed so that these images are formed at a saturation level that is at or below a specified second saturation level. For example, the second saturation level can be a specified level that is no greater than 70% saturation, no greater than 60% saturation, no greater than 50% saturation, etc. such that the average color coverage is significantly reduced by a corresponding percentage.

In order to accomplish printing and specifically, in order to accomplish printing at the reduced saturation levels at process 512-516, the controller 140 can access a color table 133 and an alternative color table 132 that are stored in the printer memory 130. These color tables 132-133 can, for example, be based on well-known HSV (Hue and Saturation) or HLS (Hue, Lightness and Saturation) color systems that are common used in the art. These tables 132 and 133 can be used by the controller 140 to map the requested (ideal) colors values contained in the print data 51 to the new reduced saturation color values indicated by the printing mode 52. Such color table techniques are well-known components of color management systems, as discussed in U.S. Pat. No. 6,972,857 referenced above. Thus, for example, the color table 133 and alternative color table 132 can be used to map a fully saturated color as indicated by the print data to a 50% saturated color and to, thereby, reduce color coverage (e.g., from an average of 6.0 grams/inch$^2$ to 2.5-3.0 grams/inch$^2$) as indicated by the selected print mode 52. The reduced resolution and reduced saturation of color and, optionally, black reduces the overall ink or toner coverage per page and, consequently, reduces the cost of printing per page.

Additionally, the method can comprise printing the monochrome and color images and, specifically, the black and color dots that form the images at a specified resolution. For example, the specified resolution can be a maximum resolution, a minimum resolution, or at any other resolution in between. Optimally, in order to balance cost and quality, the method comprises printing the monochrome and color images at a specified resolution that is less than the maximum resolution (e.g., less than the resolution 241 used in the deluxe print mode 240 of FIG. 2) and greater than the minimum resolution (e.g., greater than the resolution 211 of the draft print mode 210) (510). For example, the resolution can be set at the printer default resolution. Techniques varying resolution are well-known in the art and can include, for example, adjusting the carriage speed and/or firing frequency of the print head, as discussed in U.S. Pat. No. 6,189,993 referenced above.

In order to enhance the quality of the monochrome images and/or the color images, the method can further comprise outlining these images with solid borders (518, see edge 415 of FIG. 4). Specifically, the method can comprise printing a monochrome outline around monochrome images (e.g., by printing additional black dots to outline black text and/or black graphics). Similarly, the method can comprise printing color outlines around color images (e.g., by printing additional color and, if necessary, black dots to outline color text and/or color graphics).

Finally, while other print modes (e.g., the draft print mode) may comprise using undercoloring techniques to enhance black images (i.e., the black text and graphics), as illustrated in U.S. Patent Application Publication No. 2002/0196454 referenced above, this high saturation monochrome/low saturation color print mode can be implemented without undercolor so that no level of color ink is used in any level of black and, thus, so that the black images comprise true black and not composite black (520).

Thus, disclosed are printer and printing method embodiments that incorporate a printing mode that can be implemented with minimal additional resources and is capable of achieving high monochromatic quality at a low cost per page. Specifically, the printing mode prints fully saturated (or only minimally desaturated) monochrome images with no undercolor and significantly desaturated color images. Optionally, the printing mode prints at a less than maximum resolution, balancing cost and quality. Furthermore, in order to maintain and enhance the quality of the monochrome images and/or the color images, these images may be outlined with solid borders.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A printer comprising:
   a controller; and
   a printing mechanism operatively connected to said controller,
   wherein said controller is adapted to receive print data, to identify monochrome images and color images represented by said print data and to control said printing mechanism so that said monochrome images are printed onto a print medium at approximately a first saturation level and so that said color images are printed onto said print medium at no greater than a second saturation level that is less than said first saturation level.

2. The printer of claim 1, wherein said first saturation level is approximately equal to a maximum saturation level.

3. The printer of claim 1, wherein said first saturation level is less than a maximum saturation level.

4. The printer of claim 1, wherein said controller is further adapted to control said printing mechanism such that said printing mechanism prints said monochrome images and said color images at a specified resolution that is less than a maximum resolution.

5. The printer of claim 1, wherein said controller is further adapted to control said printing mechanism such that said printing mechanism prints monochrome outlines around said monochrome images.

6. The printer of claim 1, wherein said controller is further adapted to control said printing mechanism such that said printing mechanism prints color outlines around said color images.

7. A printer comprising:
   a controller adapted to receive print data and a selected print mode, wherein said controller is further adapted to identify monochrome images and color images represented by said print data;
   a memory device operatively connected to said controller and adapted to store a set of instructions for printing said print data according to said selected print mode, wherein said set of instructions comprises instructions for printing said monochrome images onto said print medium at approximately a first saturation level and for printing said color images onto said print medium at no greater than a second saturation level that is less than said first saturation level; and
   a printing mechanism operatively connected to said controller,
   wherein said controller is further adapted to access and execute said set of instructions in order to control said printing mechanism such said monochrome images and said color images are printed according to said selected print mode.

8. The printer of claim 7, wherein said first saturation level is approximately equal to a maximum saturation level.

9. The printer of claim 7, wherein said first saturation level is less than a maximum saturation level.

10. The printer of claim 7, wherein said set of instructions further comprises instructions for printing said monochrome images and said color images at a specified resolution that is less than a maximum resolution.

11. The printer of claim 7, wherein said set of instructions further comprises instructions for printing monochrome outlines around said monochrome images.

12. The printer of claim 7, wherein said set of instructions further comprises instructions for printing color outlines around said color images.

13. A method of printing, said method comprising:
   receiving print data representing monochrome images and color images to be printed on a print medium;
   printing said monochrome images onto said print medium at a first saturation level; and
   printing said color images onto said print medium at no greater than a second saturation level that is less than said first saturation level.

14. The method of claim 13, wherein said first saturation level is less than or equal to a maximum saturation level.

15. The method of claim 13, said monochrome images and said color images are printed at a specified resolution that is less than a maximum resolution.

16. The method of claim 13, wherein said printing of said monochrome images further comprises printing monochrome outlines around said monochrome images.

17. The method of claim 13, wherein said printing of said color images further comprises printing color outlines around said color images.

18. A method of printing, said method comprising:

receiving print data representing monochrome images and color images to be printed on a print medium;

receiving a selected print mode for printing said monochrome images and said color images;

storing a set of instructions corresponding to said selected print mode, wherein said set of instructions comprises instructions for printing said monochrome images onto said print medium at approximately a first saturation level and for printing said color images onto said print medium at no greater than a second saturation level that is less than said first saturation level; and executing said set of instructions so as to print onto said print medium said monochrome images at said first saturation level and said color images at no greater than said second saturation level.

19. The method of claim 18, wherein said first saturation level is less than or equal to a maximum saturation level.

20. The method of claim 18, said monochrome images and said color images are printed at a specified resolution that is less than a maximum resolution.

* * * * *